La Fayette Louis,

Tremolo,

No. 2,944.

Reissued May 26, 1868.

Witnesses:
Egm Lincoln.
Joseph Gavett

Inventor:
La Fayette Louis

N. PETERS, PHOTO-LITHOGRAPHER WASHINGTON, D. C.

UNITED STATES PATENT OFFICE.

LA FAYETTE LOUIS, OF PROVIDENCE, RHODE ISLAND.

IMPROVEMENT IN MELODEONS.

Specification forming part of Letters Patent No. 16,094, dated November 18, 1856; reissue No. 2,498, dated February 26, 1867; reissue No. 2,944, dated May 26, 1868.

*To all whom it may concern:*

Be it known that I, LA FAYETTE LOUIS, of Providence, in the county of Providence and State of Rhode Island, (formerly of Boston, Massachusetts,) have invented an Improvement in Melodeons; and I do hereby declare that the following, taken in connection with the drawings which accompany and form part of this specification, is a description of my invention sufficient to enable those skilled in the art to practice it.

The invention consists in combining, with a melodeon, (or that class of reed-instruments in which the air is drawn through the reeds by exhaust or rarefaction of the air in contradistinction to those instruments in which the air is driven through the reeds by pressure or condensation of the air,) a "tremolo" valve or valves, the vibrations of which, by interrupting the current of air, produce the tremolo in the sound; and also in so arranging a tremolo valve or valves in connection with the reeds and other mechanism that the vibrations of the valve or valves, and the consequent tremolo sound, may be effected at the will of the performer, with such variations as it may be desirable to produce in the rhythm of the sound.

The drawings represent so much of a melodeon embodying my improvement as will enable the invention to be clearly understood—

Figure 1:
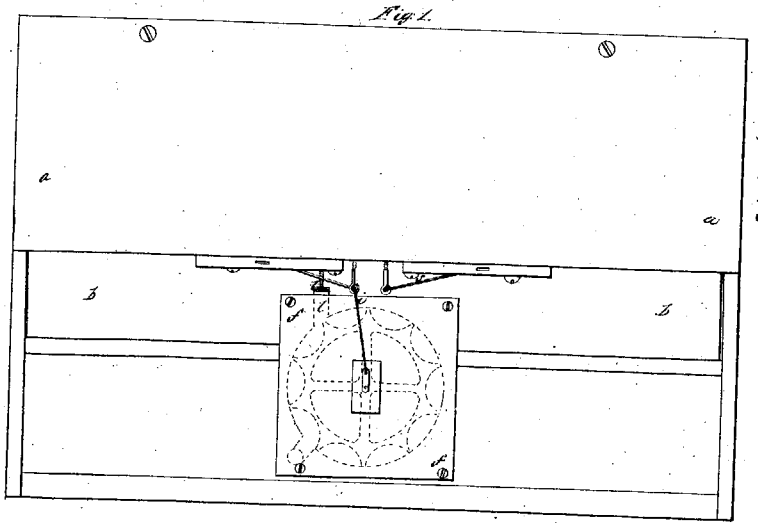
Figure 2:
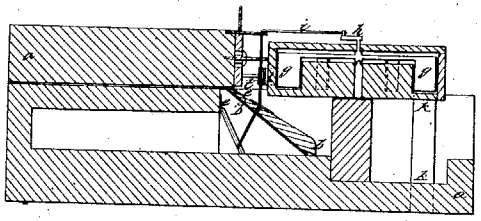
Figure 3:
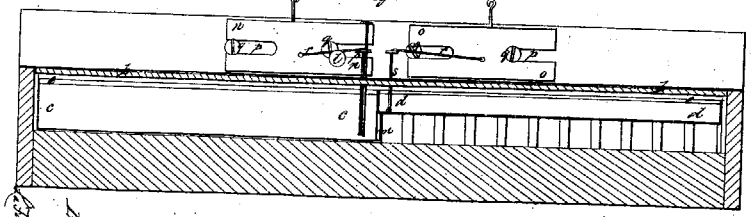

Figure 1 showing a plan, Fig. 2 a central cross-section, and Fig. 3 a longitudinal vertical section, of the same.

*a* denotes the reed-case; *b*, the ordinary swell; *c d*, two valves placed over or against the reeds, these valves turning on hinges *e*, and causing by their vibrations the tremulous effect as the air passes through the reeds, as will be readily understood.

Various means for effecting these vibrations may be employed, those herein shown being as follows: From the valve *c* a cord, *i*, passes through suitable eyes or guides to a crank, *h*, on the shaft of a fan-wheel, *g*, the blades of which rotate in a chamber or box, *f*, one side of which is connected with the bellows-chamber by a tube, *k*, while at the other side is a tube or passage, *l*, opening into the valve chamber or space.

As the bellows are operated by the pedal, the air is drawn through the reeds, valve-chamber, passage *l*, wheel-chamber, and tube *k* to the bellows, producing in its passage a rotation of the wheel *g*, which rotation, by turning the crank, imparts a reciprocating movement to the cord *i*, and a corresponding vibratory movement to the valve *c*, and thereby effecting the tremolo sound, as will be readily understood.

When two or more valves are employed, each may be similarly connected to and operated by the wheel; or one valve, *d*, may be raised by the other, *c*, through a lip, *m*, on the valve *c*, fitting against a shoulder on the valve *d*. By means of slides *n* and *o*, slots *p*, screws *q*, and cords *r s*, it will be seen that the valve *d* may be raised, as seen in Fig. 3, so as not to be vibrated by motion of the valve *c*, or that both may be raised together, so as to receive no motion from the crank-wheel, in which latter case there will be, of course, no tremolo effect.

By attaching a damper, *t*, to the slide *n*, the mouth of tube *l* may be partially closed when the valve *c* is not in operation, but allowing sufficient wind to pass to and by the wheel to keep it slowly in rotation and ready for instantly producing the vibrations of the valve when the slide is moved forward.

Other specific means may, of course, be applied to produce the vibrations of the tremolo-valve, those shown being but one provision for the same.

I claim—

1. In combination with the reeds of a melodeon (or that class of instruments in which the air is drawn through the reeds by the exhaust action of a bellows,) a tremolo valve or valves so arranged that when vibrated it or they shall interrupt the passage of air through the reeds, and thereby produce the tremolo sound at the will of the performer.

2. In combination with the reeds of a melodeon, a tremolo-valve actuated by a rotary fan or blade wheel, substantially as described.

3. In combination with the reeds of a melodeon, a tremolo valve or valves having a positive connection with the valve-actuating mechanism, substantially as described.

LA FAYETTE LOUIS.

Witnesses:

J. B. CROSBY,

FRANCIS GOULD.